April 6, 1965 H. A. KURTH 3,176,895

MAGNETIC TAPE MECHANISMS

Filed April 17, 1963 2 Sheets-Sheet 1

INVENTOR.
HAROLD A. KURTH

BY Robert G. Clay

ATTORNEY

April 6, 1965 H. A. KURTH 3,176,895

MAGNETIC TAPE MECHANISMS

Filed April 17, 1963 2 Sheets-Sheet 2

INVENTOR.
HAROLD A. KURTH

BY Robert G. Clay

ATTORNEY

United States Patent Office 3,176,895
Patented Apr. 6, 1965

3,176,895

MAGNETIC TAPE MECHANISMS

Harold A. Kurth, Woodland Hills, Calif., assignor to Ampex Corporation, Redwood City, Calif., a corporation of California Filed Apr. 17, 1963, Ser. No. 273,692
10 Claims. (Cl. 226—176)

This invention relates to magnetic tape transport systems, and more particularly to an improved pinch roller mechanism useful in systems for recording and reproducing digital data.

Magnetic tape transport systems for recording and reproducing digital data are usually required to operate intermittently, and bi-directionally, in order to satisfy the demand requirements of the digital data processing systems with which they must cooperate. A digital computer, for example, is usually employed in cooperation with a magnetic tape transport, which serves as a moderate speed, high capacity storage from which data may be extracted and on which it may be stored. As the computer carries out various parts of a program and processes data, data is taken from and recorded on the tape only during selected time intervals. Therefore, the magnetic tape transport system must quickly accelerate to a normal speed of operation, hold that speed constant until the desired data has been reproduced, then stop the tape while awaiting the next data transfer.

In order to achieve high data transfer rates, the binary data on the tape is usually recorded as densely as possible for a given installation. Typical standard bit densities are 200 bits and 556 bits per linear inch of tape. High tape speeds, such as 75 inches per second or 150 inches per second are typically used in order to provide data transfer rates of the order of hundreds of thousands of bits per second. Such data transfer rates render the magnetic tape transport compatible or nearly compatible with typical digital data processors. The fact that high data transfer rates are used, however, also means that a minimum of time must be used in bringing the tape up to normal speed. Particularly, the instantaneous speed variation must be brought to and held within certain selected limits within a given minimum period of time.

Digital magnetic tape transports usually employ a pair of oppositely rotating capstans which are driven at the nominal velocity selected for a chosen speed of tape movement. Pinch rollers located on the opposite side of the tape from each individual capstan are abruptly urged toward the associated capstan to engage the tape against the capstan so as to drive the tape in the selected direction.

The pinch roller is usually a somewhat resilient member, in order to provide the desired forceful contact between the tape and the capstan while reducing line contact between the elements.

It has been found that a relatively large amount of time is required for tape acceleration if the pinch roller must be started rotating from a stationary condition when the associated actuator is engaged. Accordingly, there have been adopted a number of schemes in which the pinch roller actuator is rotated, while disengaged, at the same peripheral velocity as the capstan or at a slightly greater velocity. In the latter example, the capstan is provided with a resilient ring which is continually engaged by the pinch roller. When the pinch roller is actuated, the resiliency of the ring on the capstan is overcome and the pinch roller urges the tape substantially uniformly into contact with the capstan.

Such expedients, however, have been found to have serious limitations when stringent demands are placed upon the time available for bringing the tape within the desired range of instantaneous speed variations. When the pinch roller is actuated, its initial speed tends to accelerate the tape very rapidly, thereby introducing a severe tension transient and tape stretch to the tape. The result is that the tape overshoots its desired nominal speed by a substantial percentage, then slows down to less than normal speed again, and continues to oscillate in diminishing fashion about the selected nominal speed until the instantaneous speed variation is brought within the desired limits. This overshoot condition materially increases the time which must be allotted to starting the tape before data transfer can begin.

It is therefore an object of the present invention to provide an improved magnetic tape transport system.

Another object of the present invention is to provide an improved system for providing rapid acceleration of a magnetic tape in an intermittently driven digital tape transport system.

Yet another object of the present invention is to provide improved pinch roller mechanisms for magnetic tape transports.

Improved magnetic tape systems in accordance with the invention may include pinch roller mechanisms which in the nonactuated position are driven at an intermediate speed which provides a peripheral velocity somewhat less than that of the capstan. When the pinch roller is actuated, the pinch roller is for a time freely rotating until it engages the tape against the capstan. The high tape acceleration interval is limited in duration. Both the pinch roller and the tape are then brought up to the selected nominal velocity without the substantial overshoot of the prior art systems, so that the instantaneous speed variation is quickly brought to within the desired limits.

In a specific example of a pinch roller mechanism for digital tape transports, in accordance with the invention, the pinch roller is normally rotated in its engaged position, at a peripheral velocity of between 50% to approximately 80% of its desired final velocity. To this end, the pinch roller is kept in contact, when disengaged from the capstan, with a driven roller which is rotated by a pulley driven by the capstan. When the pinch roller is actuated, it moves in free rotation into engagement with the capstan, and both the tape and the pinch roller are brought smoothly up to speed without substantial overshoot.

A better understanding of the invention may be had with reference to the following, taken in conjunction with the accompanying drawings, in which.

Figure 1:
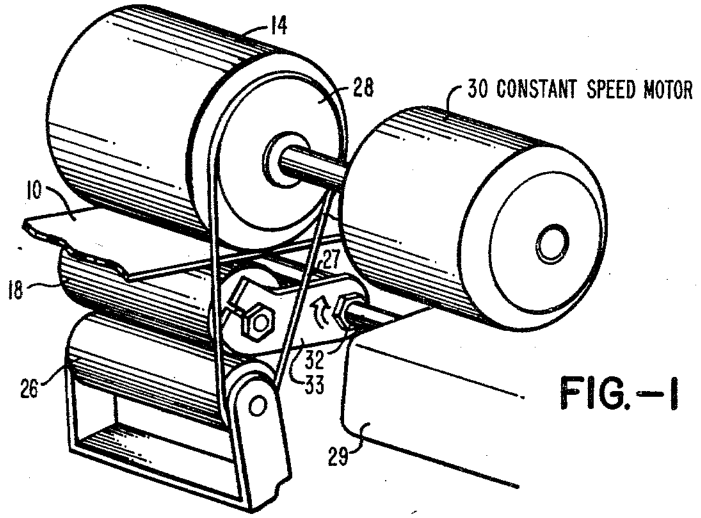
FIGURE 1 is an enlarged perspective view of the details of a pinch roller mechanism for digital tape transports in accordance with the present invention.
Figure 2:
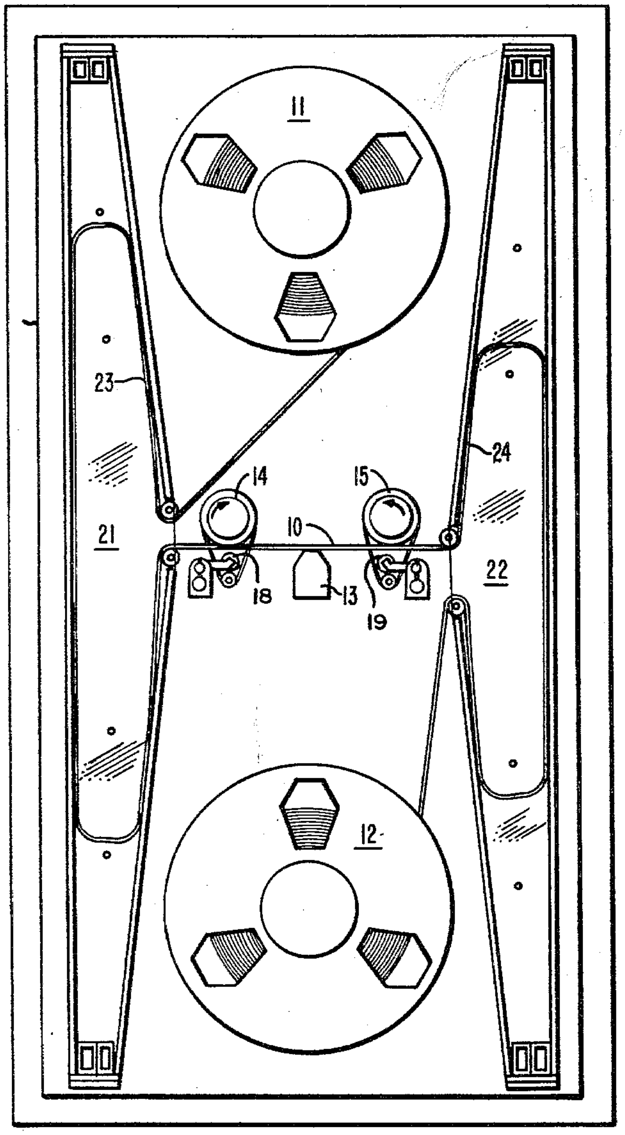
FIGURE 2 is a simplified schematic diagram representation on a magnetic tape transport system utilizing pinch roller mechanisms in accordance with the invention.

Referring now to FIGURE 2, a magnetic tape transport, of which only the front panel and the elements mounted thereon are shown in simplified form for brevity, includes a magnetic tape 10 arranged to pass between a pair of reels 11 and 12, designated supply and take-up reels respectively. Signal recording and reproduction are effected at a magnetic head assembly 13, and the tape 10 is driven bi-directionally relative to the magnetic head assembly 13 by a pair of oppositely rotating capstans 14 and 15. Rollers and other guides which may be employed for confining the tape 10 precisely to a selected path have not been shown for simplicity. The tape 10 is urged into engagement with either of the selected capstans 14 or 15 by one of the two different pinch roller mechanisms 18 or 19, such as shown in detail in conjunction with FIGURES 1 and 4. Between the capstans 14 and 15 and the associated reels 11 and 12, there may be mounted individual compliance mechanisms, such as the illustrated vacuum chambers 21 and 22, in order to provide different lengths of tape having extremely low inertia for sudden starts and stops. The tape loops 23 and 24 within the vacuum chambers 21 and 22 provide intermediate storage lengths between the capstans 14 and 15 and the reels 11 and 12, so that when the tape 10 is started, stopped, and reversed at high speed the only inertia which must be overcome is that of the tape loops. The relatively slower acting reel motors (not shown) and the relatively far higher inertia reel mechanisms with the tap wound thereon, may thus be brought up to speed at much slower rates.

Figures 3, 4:
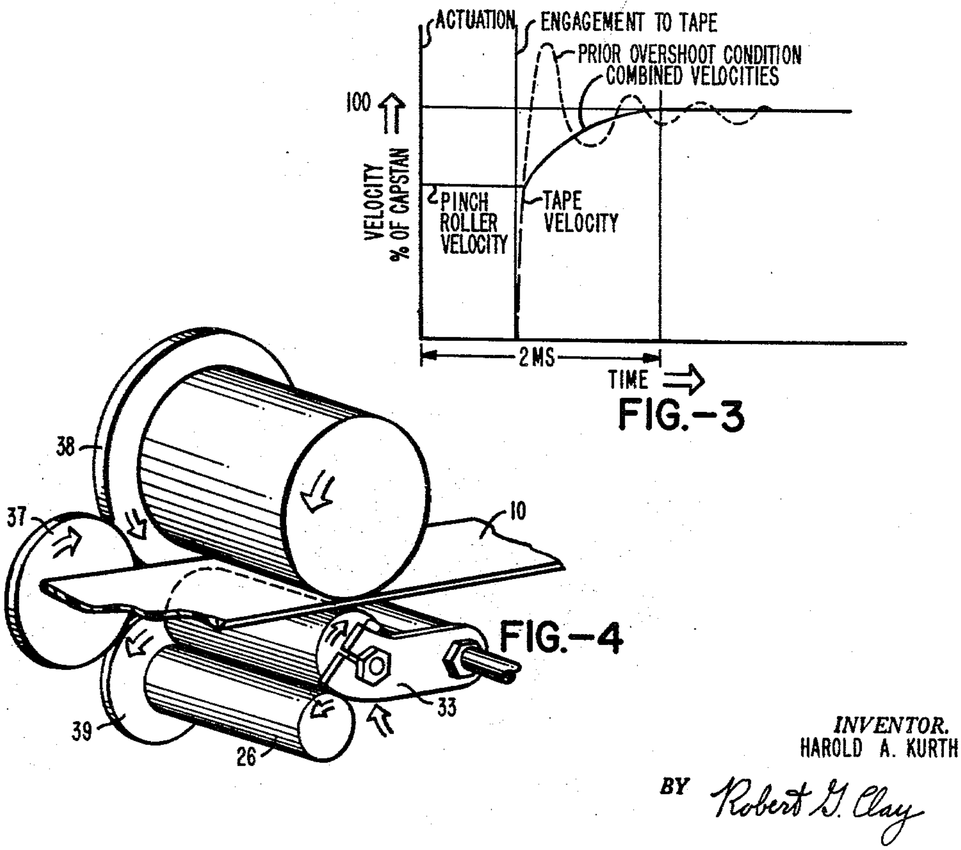
FIGURE 3 is an idealized graphical representation of the operation of a magnetic tape transport system according to the invention.
FIGURE 4 is an enlarged perspective view showing details of another pinch roller mechanism in accordance with the invention, which utilizes an idler roller for speed reduction.

The pinch roller mechanisms 18 and 19, shown in FIGURES 1 and 4 in greater detail, are independently driven in the disengaged position at speeds which are selected relative to the allowable start-up time, the size of the tape, and the inertia of the pinch roller and the capstan. In the example of FIGURE 1, the tape drive mechanism includes a resilient pinch roller 18, a driven roller 26 substantially fixedly mounted on the tape transport panel, and a nylon belt 27 coupling the pulley on the driven roller 26 to the capstan pulley 28. The pinch roller 18, in its disengaged position, is held by an actuator 29 against the driven roller 26, whereas in its actuated or engaged position it is caused to urge the tape 10 against the capstan 14. The inertia of the pinch roller 18 is substantially greater than that of the length of tape 10 which is accelerated. The capstan 14 is continuously driven by a constant speed motor 30, the term "constant speed" being intended to include conventional servo systems, details of which are not shown.

When the pinch roller actuator 29 is energized, the pinch roller 18 is urged against the capstan 14, causing a change of speed of both the tape 10 and the pinch roller 18. Preferably, the pinch roller 18 is held in its disengaged position at a peripheral velocity which is between 50% and 80% of the peripheral velocity of the capstan 14. On actuation the actuator shaft 32 is rotated, lifting the pinch roller 18 by means of supporting arms 33 from the driven roller 26 toward the capstan 14. After leaving the driven roller 26, the pinch roller freely rotates in low friction bearings within the supporting arms 33 until it first makes contact with the tape 10 and then through the tape 10 with the capstan 14. Both the inertia of the tape 10 and the inertia of the pinch roller 18 must thereafter be overcome by the action of the capstan 14, bringing these elements up to the selected terminal velocity.

As illustrated in FIGURE 3, this arrangement utilizes the fact that the tape 10 is first accelerated by the slower speed pinch roller 18, and not initially and completely by the capstan 14. Specifically, the tape 10 is initially brough up to a limited lower speed equal to the peripheral velocity of the pinch roller 18. This limited acceleration interval is short in duration and no substantial tape tension transients are introduced, so that tape stretching effects are not encountered. In the prior art systems, as illustrated by the dotted line curve, the high acceleration rate continues over a longer interval and results in substantial overshoot as the added speed derived from reaction to tape stretching is added to the capstan speed. In the present system, both the tape 10 and the pinch roller 18 are together brought to the peripheral velocity of the capstan 14 at a diminishing acceleration rate. Thus the gradual speed change of the pitch roller 18 as its inertia is overcome insures a smooth and predictable attainment of the final speed.

This arrangement has been found in practice to provide markedly improved results over the full speed pinch roller and other arrangements of the prior art. Instantaneous speed variation is brought within selected limits within a time interval of less than two milliseconds, for example, for 1 inch tape operated at rates of 133 and 150 inches per second. The amplitude of the transient created in the tape movement across the band is greatly diminished due to the shorter initial acceleration interval and the subsequent diminishing speed change rate resulting from the slower speed of the pinch roller and its inertia. Consequently, the start-up characteristics are made much more uniform.

In the FIGURE 1 example, the desired speed reduction between the peripheral speed of the capstan 14 and the speed of the driven roller 26 is accomplished by using a capstan pulley 28 having a predetermined smaller diameter than the capstan 18. Alternatively, as shown in FIGURE 4, one idler roller 37 or more may be employed to transfer the rotation energy at the correct speed ratio between the capstan 18 and the idler roller 26 as determined by the diameters of respective end rollers 38 and 39. It will also be appreciated by those skilled in the art that other expedients may also be utilized for predriving the pinch roller. The pinch roller 18, for example, may be driven separately from an independent motor, particularly if it is desired to be able to change the speed relationship within relatively wide limits in accordance with tape size and type, and desired start characteristics.

While I have described above and illustrated in the drawings various forms of pinch roller mechanisms for magnetic tape transports in accordance with the invention, it will be appreciated that the invention is not limited thereto. Accordingly, the invention should be considered to include alternative forms, variations and modifications falling within the scope of the appended claims.

What is claimed is:

1. A magnetic tape transport system for intermittently driving a magnetic tape, and for bringing the tape up to a selected terminal velocity within a very brief interval but without introducing significant abrupt discontinuities in tape motion, including the combination of a rotating capstan having a peripheral velocity corresponding to the selected tape velocity, a pinch roller mechanism disposed on the opposite side of the tape from the capstan and not in engagement therewith when in an unactuated position, means for actuating the pinch roller mechanism in the direction toward the capstan to urge the tape against the capstan, and means positioned to rotatably engage the pinch roller mechanism in the unactuated position, the last-named means imparting a peripheral velocity to the pinch roller mechanism which is between 50 and 80% of the peripheral velocity of the capstan, and the pinch roller being freely rotating between the unactuated position and the capstan when actuated.

2. A system for quickly bringing a tape member to a selected velocity comprising a rotating drive capstan having the selected velocity, the capstan being positioned adjacent to the tape member, a freely rotating pinch roller positioned on the opposite side of the tape member from the capstan, means for selectively engaging and disengaging the pinch roller relative to the capstan, and means for driving the pinch roller at a velocity lower than the selected velocity when in the disengaged position, whereby the pinch roller and the tape member are brought to the selected velocity at a decreasing acceleration rate due to the pinch roller inertia when the pinch roller is engaged.

3. A magnetic tape transport system for intermittently driving a magnetic tape, and for bringing the tape up to a selected terminal velocity within a very brief interval comprising a rotating capstan having a peripheral velocity corresponding to the selected tape velocity, a pinch roller mechanism disposed on the opposite side of the tape from the capstan, means for actuating the pinch roller mechanism between an engaged position and a disengaged position, said actuating means moving the pinch roller mechanism to urge the tape against the capstan in the engaged position, and means positioned to rotatably engage the pinch roller in the disengaged position to impart a peripheral velocity to the pinch roller not exceeding the peripheral velocity of the capstan, the pinch roller being freely rotating between the disengaged position and the engaged position.

4. A system for bringing a tape up to a selected tape velocity within a very brief interval comprising a rotating capstan having a peripheral velocity corresponding to the selected tape velocity, a substantially constant speed motor coupled to drive the rotating capstan, one surface of the tape being slightly spaced from the periphery of the rotating capstan, pinch roller means disposed on the opposite side of the tape from the capstan for engaging the opposite tape surface and urging the tape against the capstan, the pinch roller means being movable between an unactuated position in which said pinch roller means is not in engagement with the tape, and an actuated position in which said pinch roller means is urged against the capstan, and means for imparting rotational energy to the pinch roller means in the unactuated position, said pinch roller means having a peripheral velocity below the selected tape velocity, and actuating means for causing said pinch roller means to move to the actuated position to engage first the tape and then urge the tape against the capstan surface while said pinch roller means is substantially disengaged from the means for imparting rotational energy thereto.

5. A tape transport system comprising a pair of oppositely rotating capstans disposed along the tape path and in contact therewith, constant speed motor means coupled to each of the capstans for driving them in opposite directions at a peripheral velocity equal to a selected tape velocity, a separate pinch roller mechanism disposed on the opposite side of the tape from each of the capstans, each pinch roller mechanism being movable between an unactuated and an actuated position, actuating means for each of the pinch roller mechanisms for urging the tape against a selected capstan, and means for rotatably engaging the pinch roller mechanisms when not actuated for imparting a peripheral velocity to the pinch roller mechanism which is between 50% and 80% of the peripheral velocity of the capstan, the pinch roller mechanism being substantially disengaged from the last named means between the unactuated and the actuated position.

6. A tape driving system comprising capstan means engaging the tape and having a peripheral velocity equal to a selected tape velocity, constant speed power means positively coupled to drive the capstan means at the constant selected velocity, and freely rotating means normally not in engagement with the tape for selectively urging the tape against the capstan means, said freely rotating means having an initial peripheral velocity prior to engagement with the tape which is a substantial fraction of the peripheral velocity of the capstan means.

7. A magnetic tape transport system for intermittently driving a magnetic tape, and for bringing the tape up to a selected terminal velocity within a very brief interval including the combination of a rotating capstan having a peripheral velocity corresponding to the selected tape velocity, a movable pinch roller mechanism disposed on the opposite side of the tape from the capstan, actuating means for moving the pinch roller from a disengaged to an engaged position to urge the tape against the capstan, a fixed roller positioned to rotatably engage the periphery of the pinch roller mechanism only when it is in the unactuated position, said fixed roller having a peripheral velocity between 50% and 80% of the peripheral velocity of the capstan, said pinch roller being disengaged from the fixed roller for free rotation as the tape is urged toward engagement with the capstan periphery.

8. The magnetic tape transport system of claim 7 further including a mechanical speed reduction means coupling said capstan to said fixed roller to provide a rotational driving force to the fixed roller in correct proportion to the capstan speed.

9. The magnetic tape transport system of claim 8 in which the speed reduction means comprises a first pulley coupled for rotation with the capstan and having a diameter smaller than the peripheral diameter of the capstan, a second pulley coupled to the fixed roller, and a belt coupling the rotational motion of said first pulley to the second pulley.

10. The magnetic tape transport system of claim 8 in which said speed reduction means comprises a first roller driven by the capstan rotation, a second roller coupled for rotation with the fixed roller, and an idler roller means coupling the rotation of the first roller to that of the second roller, said first roller having a diameter in proportion to the diameter of the capstan proportionally smaller than the diameter of the second roller and proportioned to the diameter of the fixed roller.

References Cited by the Examiner

UNITED STATES PATENTS

| | | | |
|---|---|---|---|
| 3,075,682 | 1/63 | Hebb. | |
| 3,079,056 | 2/63 | Groenwegen | 226—178 |
| 3,099,376 | 7/63 | Kennedy | 226—181 XR |
| 3,100,591 | 8/63 | Trimble | 226—39 |

ROBERT B. REEVES, *Acting Primary Examiner.*

ERNEST A. FALLER, SAMUEL F. COLEMAN, *Examiners.*